US012706365B2

(12) United States Patent
Baur et al.

(10) Patent No.: US 12,706,365 B2
(45) Date of Patent: Aug. 11, 2026

(54) DEVICE FOR A TRANSITION OF A HIGH-FREQUENCY CONNECTION BETWEEN A STRIP CONDUCTOR CONNECTION AND A WAVEGUIDE, HIGH-FREQUENCY ARRANGEMENT, AND RADAR SYSTEM

(71) Applicant: Robert Bosch GmbH, Stuttgart (DE)

(72) Inventors: Klaus Baur, Mietingen (DE); Minh Nhat Pham, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 139 days.

(21) Appl. No.: 18/718,932

(22) PCT Filed: Jan. 18, 2023

(86) PCT No.: PCT/EP2023/051091
§ 371 (c)(1),
(2) Date: Jun. 12, 2024

(87) PCT Pub. No.: WO2023/165756
PCT Pub. Date: Sep. 7, 2023

(65) Prior Publication Data
US 2025/0046976 A1 Feb. 6, 2025

(30) Foreign Application Priority Data
Mar. 4, 2022 (DE) ..................... 10 2022 202 220.3

(51) Int. Cl.
*H01P 5/08* (2006.01)
*H01P 3/08* (2006.01)
(Continued)

(52) U.S. Cl.
CPC .................. *H01P 5/08* (2013.01); *H01P 3/08* (2013.01); *H01P 3/12* (2013.01); *H01Q 1/3233* (2013.01); *H01Q 9/0407* (2013.01)

(58) Field of Classification Search
CPC .... H01P 5/08; H01P 5/087; H01P 5/10; H01P 5/107; H01P 5/1022; H01Q 1/22; H01Q 1/2208; H01Q 1/3233; G01S 13/88
See application file for complete search history.

(56) References Cited

U.S. PATENT DOCUMENTS

2006/0274992 A1 12/2006 Shimura et al.
2023/0358855 A1* 11/2023 Baur .................... H01Q 1/2208

FOREIGN PATENT DOCUMENTS

DE 102019217736 A1 5/2021
EP 0925617 B1 12/2000
(Continued)

OTHER PUBLICATIONS

International Search Report for PCT/EP2023/051091, Issued Mar. 30, 2023.

*Primary Examiner* — Stephen E. Jones
(74) *Attorney, Agent, or Firm* — Norton Rose Fulbright US LLP

(57) ABSTRACT

A transition between a strip conductor connection and a waveguide for a high-frequency connection. A strip conductor connection is arranged on a carrier substrate and is adjoined by a transition to a waveguide structure integrated into the carrier substrate. This waveguide structure integrated into the carrier substrate is adjoined by a waveguide on an outer side of the carrier substrate.

7 Claims, 2 Drawing Sheets

(51) Int. Cl.

| | |
|---|---|
| ***H01P 3/12*** | (2006.01) |
| ***H01Q 1/32*** | (2006.01) |
| ***H01Q 9/04*** | (2006.01) |

(56) References Cited

FOREIGN PATENT DOCUMENTS

| | | | |
|---|---|---|---|
| EP | 3955376 | A1 | 2/2022 |
| JP | 2016127511 | A | 7/2016 |

* cited by examiner

DEVICE FOR A TRANSITION OF A HIGH-FREQUENCY CONNECTION BETWEEN A STRIP CONDUCTOR CONNECTION AND A WAVEGUIDE, HIGH-FREQUENCY ARRANGEMENT, AND RADAR SYSTEM

FIELD

The present invention relates to a device for a transition of a high-frequency connection between a strip conductor connection and a waveguide. The present invention also relates to a high-frequency arrangement and to a radar system comprising such a device.

BACKGROUND INFORMATION

Radar systems, such as those used in the automotive sector, require an antenna or an antenna system for transmitting high-frequency signals and for receiving the reflections of the transmitted high-frequency signals. In addition to the frequently used patch antennas, waveguide antennas can alternatively, for example, also be used for this purpose. However, in this case, a transition of the high-frequency line between the waveguide and a strip conductor connection for connecting the high-frequency electronics is required.

European Patent No. EP 0 925 617 B1, for example, describes a transition from a waveguide to a strip line. For this purpose, this publication proposes to provide a web which extends from a waveguide wall opposite the strip line and is contacted with the strip line, in the transition region.

SUMMARY

The present invention provides a device for a transition of a high-frequency connection between a strip conductor connection and a waveguide, a high-frequency arrangement, and a radar system. Advantageous embodiments of the present invention are disclosed herein.

Provided according to an example embodiment of the present invention is therefore:

A device for a transition of a high-frequency connection between a strip conductor connection and a waveguide, with an electrically insulating carrier substrate, wherein the electrically insulating carrier substrate has a top side and a bottom side opposite the top side. The carrier substrate comprises a first portion with a strip conductor structure. Furthermore, the carrier substrate comprises a second portion with a waveguide structure integrated into the carrier substrate. Moreover, the carrier substrate comprises a third portion with a waveguide arranged on an outer side of the carrier substrate. The second portion is arranged between the first portion and the third portion.

Provided according to an example embodiment of the present invention is furthermore:

A high-frequency arrangement with a device according to the present invention for the transition between a strip conductor connection and a waveguide, and a monolithic microwave integrated circuit (MMIC). The MMIC is arranged in the first portion on the top side of the carrier substrate.

Provided according to an example embodiment of the present invention is:

A radar system with a high-frequency arrangement according to the present invention. In particular, the MMIC may in this case be designed to generate high-frequency signals, which are emitted by an antenna structure of the radar system, and to evaluate reflected high-frequency signals, which are received by an antenna structure of the radar system.

Numerous electronic circuits for high-frequency applications, such as those used for radar systems in motor vehicles, can provide the high-frequency signals, generated by the circuit, via a strip conductor connection and can receive external signals via such a strip conductor connection. Patch antennas can, for example, be connected very easily by means of such strip conductor connections. However, waveguide antennas can also be used in numerous applications as an alternative to such patch antennas. For connecting waveguide antennas, a transition between the strip conductor connection and the waveguide is however required.

In the course of increasing optimization and miniaturization, monolithic microwave integrated circuits (MMIC) or the like are also used increasingly for generating and processing high-frequency signals. These MMICs are generally arranged on a printed circuit board substrate, wherein the high-frequency connection takes place via the aforementioned strip conductor connection.

It is therefore a feature of the present invention to create a transition from a strip conductor connection to a waveguide that efficiently integrates into an overall concept with an MMIC on a printed circuit board substrate.

According to an example embodiment of the present invention, it is provided for this purpose to realize the transition from a strip conductor connection to a waveguide by means of the carrier substrate, which can also be used for the printed circuit board substrate for accommodating the MMIC. In this way, a compact and low-loss transition between the strip conductor connection and a waveguide can be created.

According to an example embodiment of the present invention, it is in this case provided to first form a transition from the strip conductor connection into a portion with a waveguide structure integrated into the carrier substrate. In the further course, this waveguide structure integrated into the carrier substrate is adjoined by a waveguide on an outer side of the carrier substrate. By this two-stage transition, first from the strip conductor connection into the waveguide structure integrated into the carrier substrate and subsequently from the waveguide structure integrated into the carrier substrate onto the actual waveguide, an adjusted and low-loss transition from the strip conductor onto the waveguide can be realized simply and efficiently. In particular, the printed circuit board substrate on which the electronic components and, for example, the MMIC are arranged can be used as the carrier substrate in this case. A compact and, at the same time, cost-effective design can thus be used for the transition from the strip conductor structure onto the waveguide.

According to one example embodiment of the present invention, the strip conductor structure in the first portion comprises an electrical conductive path on the top side of the carrier substrate and an electrically conductive coating on the bottom side of the carrier substrate. In this case, the waveguide in the third portion can likewise be arranged on the top side of the carrier substrate. In this way, all raised components, such as waveguides and other electronic components, for example the MMIC, are arranged on the top side, while only an electrically conductive coating is provided on the bottom side. This results in a smooth or planar bottom side without raised structures.

According to one example embodiment of the present invention, the waveguide structure, integrated into the carrier substrate, of the second portion comprises a respective electrically conductive coating on the top side and the bottom side of the carrier substrate. Furthermore, the lateral boundary of the waveguide structure, integrated into the carrier substrate, of the second portion is formed by means of electrically conductive through-connections between the top side and the bottom side. These electrically conductive through-connections thus form a type of side walls of the waveguide structure integrated into the carrier substrate. A waveguide structure adjusted to the respective needs and the properties of the high frequency to be transferred can thereby be easily formed in the substrate.

According to one example embodiment of the present invention, the waveguide structure, integrated into the carrier substrate, of the second portion and the waveguide arranged on the carrier substrate overlap in an overlap region. The transition from the waveguide structure, integrated into the carrier substrate, into the waveguide on the carrier substrate takes place in this overlap region.

According to one example embodiment of the present invention, an aperture is provided on the top side of the electrically conductive coating, in the overlap region, between the waveguide structure integrated into the carrier substrate and the waveguide arranged on the carrier substrate. Accordingly, the high-frequency signal can propagate through this aperture.

According to one example embodiment of the present invention, an electrically conductive connection element is provided on an edge of this aperture. By means of such an electrically conductive connection element, an electrical short circuit between the top side and the bottom side for terminating the waveguide structure integrated into the carrier substrate can be formed at this position. The waveguide structure integrated into the substrate can be adjusted in this way.

According to one example embodiment of the present invention, an electrically conductive adjustment element is provided in an inner region of the aperture. This adjustment element is arranged insulated from the surrounding, electrically conductive coating. An alternative adjustment for the transition from the waveguide structure integrated into the carrier substrate onto the waveguide arranged on the top side can thereby be realized.

According to one example embodiment of the present invention, the waveguide in the third portion comprises at least one antenna element. By means of such an antenna element, a high-frequency signal can be emitted into the environment and/or high-frequency signals can be received from the environment and conducted into the waveguide. The antenna element(s) in the waveguide may, for example, be horn antennas or the like.

The above configurations and developments can be combined with one another in any desired manner if useful. Further configurations, developments and implementations of the present invention also include not explicitly mentioned combinations of features of the present invention described above or below with respect to the exemplary embodiments. The person skilled in the art will in particular also add individual aspects as improvements or additions to the respective basic forms of the present invention.

BRIEF DESCRIPTION OF THE DRAWINGS

Further features and advantages of the present invention are explained below with reference to the figures.

DETAILED DESCRIPTION OF EXAMPLE EMBODIMENTS

Figure 1:
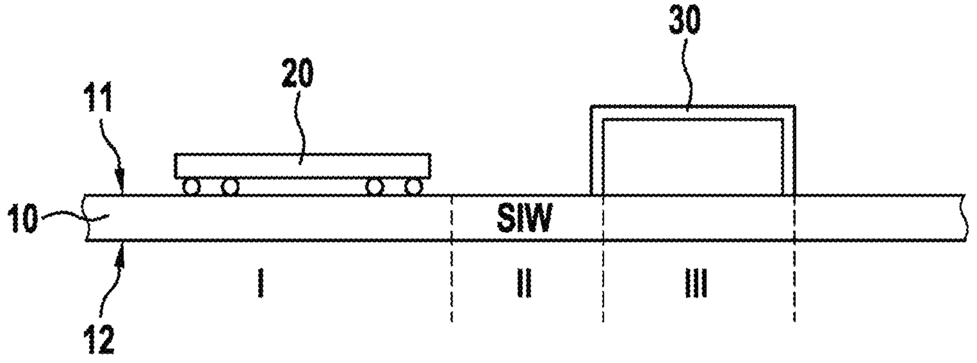
FIG. 1 shows a schematic representation of a cross-section through a high-frequency arrangement in a device for a transition between a strip conductor connection and a waveguide, according to one example embodiment of the present invention.

FIG. 1 shows a schematic representation of a cross-section through a high-frequency arrangement according to one embodiment. Such a high-frequency arrangement can, for example, be used for a radar system, in particular a radar system in a motor vehicle. The high-frequency arrangement comprises a component 20 with a monolithic microwave integrated circuit (MMIC). This component 20 can be arranged on a printed circuit board 10. For example, the connecting elements of the component 20 can be soldered to corresponding conductive path structures on the carrier substrate 10. For this purpose, a ball grid array (BGA) structure can be provided on the bottom side of the component 20, for example. However, any other suitable contacting options are also possible in principle. In addition to the voltage supply, the data lines and the signal lines, the component 20 can also comprise one or more terminals for transmitting high-frequency signals and/or receiving high-frequency signals. For this purpose, the corresponding terminals can be connected to one or more strip lines located on the carrier substrate 10 in the region of the component 20. Such a strip conductor arrangement can, for example, be formed by an electrically conductive structure on the top side 11 and an electrically conductive coating on the bottom side 12 of the support structure 10. Here and below, the top side 11 refers to the side of the carrier structure 10 on which the component 20 is located.

The strip conductor structure in the first portion I in the region of the component 20 transitions in region II into a waveguide structure integrated into the carrier substrate 10. For this purpose, a corresponding transition element can be provided in the transition from the strip conductor structure in portion I to the waveguide structure, integrated into the carrier substrate, in portion II. The portion II with the waveguide structure integrated into the carrier substrate 10 is adjoined by a waveguide 30 in portion III on the top side 11 of the carrier substrate 10. In this way, a transition between the waveguide 30 in the third portion III and the strip conductor structure in portion I can be created.

Such an arrangement makes it possible to conduct the high-frequency signals output by the component 20, for example the MMIC, on the strip conductor structure into the waveguide 30 and, in the further course, to emit the high-frequency signals via a waveguide antenna, for example one or more horn antennas. It is also possible to conduct high-frequency signals received from waveguide antennas to the strip conductor structure and further to the component 20.

Figure 2:
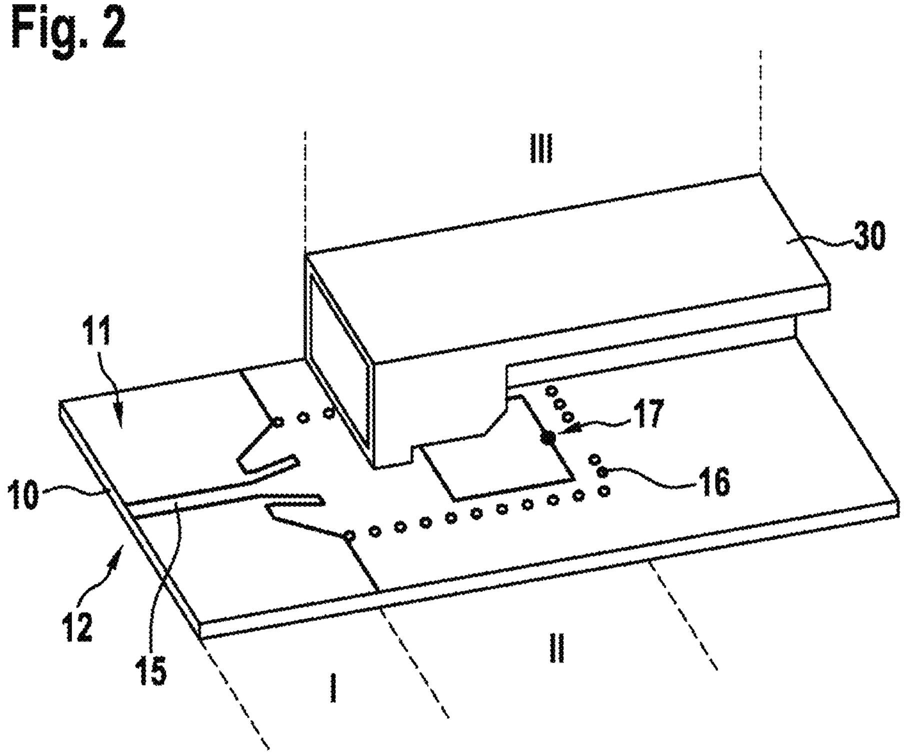
FIG. 2 shows a perspective representation of a device for the transition of a high-frequency connection between a strip conductor connection and a waveguide, according to one example embodiment of the present invention.

FIG. 2 shows a perspective view of the device for the transition between the strip conductor connection in portion I and the waveguide in portion III, according to one embodiment. In the first portion I, a conductive path 15 for a strip conductor structure is provided on the top side. In the region of a transition element 14, this strip conductor structure transitions into a waveguide structure integrated into the carrier substrate 10. This waveguide structure integrated into the carrier substrate 10 extends across the portion II.

The waveguide structure integrated into the carrier substrate 10 is in this case formed by electrically conductive coatings on the top side 11 and the bottom side 12 of the carrier substrate 10. The lateral boundaries of this waveguide structure integrated into the carrier substrate 10 can, for example, be formed by means of electrically conductive through-connection elements 16. It is understood that a material which is suitable for the propagation of the high-frequency signals in the waveguide structure integrated into the carrier substrate 10 is in this case selected for the material for the carrier substrate 10.

In portion III, as already described above, a waveguide 30 on the top side 11 of the carrier substrate 10 is adjoined thereto. Here, the waveguide structure integrated into the carrier substrate 10 and the waveguide 30 arranged on the carrier substrate 10 can overlap in an overlap region. In this overlap region, an aperture can be provided in the electrically conductive coating on the top side 11 of the carrier substrate. Through this aperture, the high-frequency signal can thus propagate between the waveguide structure integrated into the carrier substrate 10 and the waveguide 30.

Furthermore, by means of an electrically conductive connection between the coating on the top side 11 and the coating on the bottom side 12, for example, the frequency properties or propagation properties of the waveguide structure integrated into the carrier substrate 10 can be adjusted. In particular, the waveguide structure integrated into the carrier substrate 10 is thereby terminated by a short circuit 17.

Figure 3:
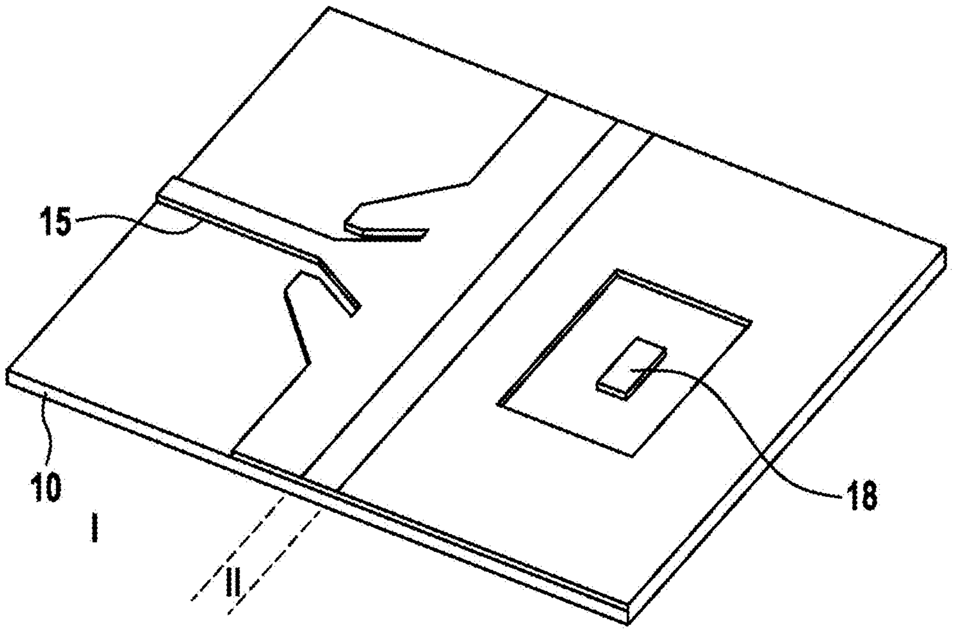
FIG. 3 shows a perspective representation of a partial view of a device for the transition of a high-frequency connection between a strip conductor connection and a waveguide, according to a further example embodiment of the present invention.

FIG. 3 shows a schematic representation for an alternative adjustment of the transition between the waveguide structure integrated into the carrier substrate 10 and the adjoining waveguide 30 on the carrier substrate 10. In this case, an electrically conductive adjustment element 18 can be provided in the aperture of the electrically conductive coating on the top side of the carrier substrate 10, through which aperture the transition between the waveguide 30 and the waveguide structure integrated into the carrier substrate 10 takes place. This adjustment element 18 may, for example, be an electrically conductive element which is arranged spaced apart, i.e., insulated from the remaining electrically conductive coating on the top side 11 of the carrier substrate 10.

Otherwise, the construction here corresponds to the above-described construction for the transition from the strip conductor connection to the waveguide 30.

Figure 4:
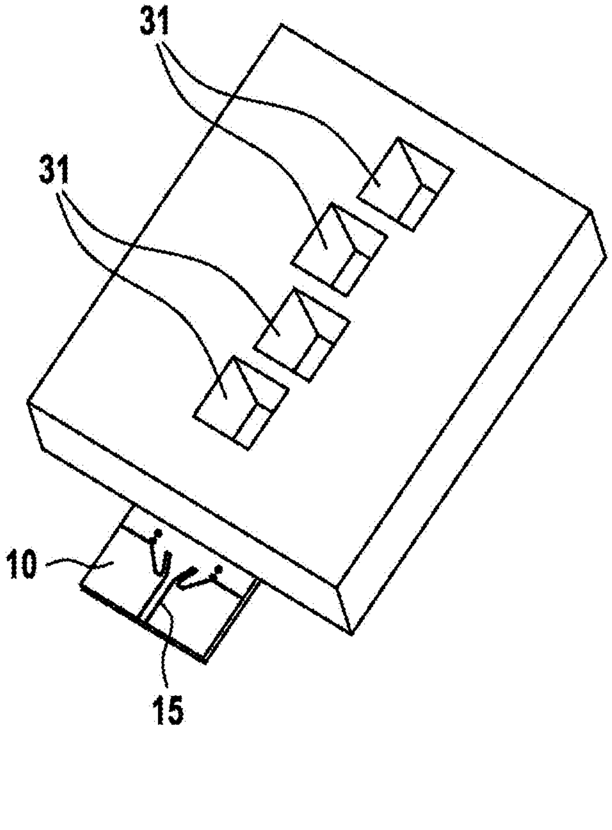
FIG. 4 shows a schematic representation of a device for the transition of a high-frequency connection with integrated antenna elements, according to one example embodiment of the present invention.

FIG. 4 shows an exterior perspective view of a device for the transition of a high-frequency connection between a strip conductor connection and a waveguide 30, according to one embodiment. This can, for example, be one of the embodiments described above. As can additionally be seen in FIG. 4, one or more antenna elements 31 can be arranged on the waveguide 30. For example, slots which are adjoined by one or more antenna elements 31 can be provided in the waveguide 30. For example, as shown in FIG. 4, these antenna elements may be horn antenna elements. The number of four horn antenna elements shown here merely serves as an example and does not constitute a restriction of the present invention.

Such an arrangement with a transition from a strip conductor structure to a waveguide and, optionally, adjoining waveguide antenna elements can, for example, be used for a radar system, in particular a radar system in a motor vehicle.

In summary, the present invention relates to a transition between a strip conductor connection and a waveguide for a high-frequency connection. For this purpose, it is proposed to arrange a strip conductor connection on a carrier substrate. This strip conductor connection is adjoined by a transition to a waveguide structure integrated into the carrier substrate. This waveguide structure integrated into the carrier substrate is thereafter adjoined by a waveguide on an outer side of the carrier substrate.

The invention claimed is:

1. A high-frequency arrangement, comprising:

a device for a transition of a high-frequency connection between a strip conductor connection and a waveguide, including:

an electrically insulating carrier substrate with a top side and a bottom side opposite the top side, wherein the carrier substrate includes a first portion with a strip conductor structure, a second portion with a waveguide structure integrated into the carrier substrate, and a third portion with a waveguide arranged on an outer side of the carrier substrate, wherein the second portion is arranged between the first portion and the third portion, wherein the waveguide structure, integrated into the second portion of the carrier substrate, and the waveguide arranged on the carrier substrate at least partially overlap in an overlap region, wherein an aperture is provided in the overlap region in an electrically conductive coating on the top side of the carrier substrate for the waveguide structure integrated into the second portion of the carrier substrate, and wherein an electrically conductive connection element is provided on an edge of the aperture and is configured to electrically contact the electrically conductive coating on the top side and an electrically conductive coating on the bottom side of the carrier substrate with one another; and a monolithic microwave integrated circuit arranged in the first portion on the top side of the carrier substrate.

2. A device for a transition of a high-frequency connection between a strip conductor connection and a waveguide, comprising:

an electrically insulating carrier substrate with a top side and a bottom side opposite the top side;

wherein the carrier substrate includes a first portion with a strip conductor structure, a second portion with a waveguide structure integrated into the carrier substrate, and a third portion with a waveguide arranged on an outer side of the carrier substrate, wherein the second portion is arranged between the first portion and the third portion, wherein the waveguide structure, integrated into the second portion of the carrier substrate, and the waveguide arranged on the carrier substrate at least partially overlap in an overlap region, wherein an aperture is provided in the overlap region in an electrically conductive coating on the top side of the carrier substrate for the waveguide structure integrated into the second portion of the carrier substrate, and wherein an electrically conductive connection element is provided on an edge of the aperture and is configured to electrically contact the electrically conductive coating on the top side and an electrically conductive coating on the bottom side of the carrier substrate with one another.

3. The device according to claim 2, wherein the strip conductor structure in the first portion includes an electrically conductive path on the top side and the electrically conductive coating on the bottom side of the carrier substrate, and wherein the waveguide in the third portion is arranged on the top side of the carrier substrate.

4. The device according to claim 2, wherein the waveguide structure, integrated into the second portion of the carrier substrate includes an electrically conductive coating on the top side and the bottom side, and wherein lateral boundaries of the waveguide structure, integrated into the second portion of the carrier substrate, are formed using electrically conductive through-connection elements between the top side and the bottom side.

5. The device according to claim 2, wherein an electrically conductive adjustment element is provided in an inner region of the aperture.

6. The device according to claim 2, wherein the waveguide of the third portion includes at least one antenna element.

7. A radar system, comprising:

a high-frequency arrangement including:

a device for a transition of a high-frequency connection between a strip conductor connection and a waveguide, including:

an electrically insulating carrier substrate with a top side and a bottom side opposite the top side, wherein the carrier substrate includes a first portion with a strip conductor structure, a second portion with a waveguide structure integrated into the carrier substrate, and a third portion with a waveguide arranged on an outer side of the carrier substrate, wherein the second portion is arranged between the first portion and the third portion, wherein the waveguide structure, integrated into the second portion of the carrier substrate, and the waveguide arranged on the carrier substrate at least partially overlap in an overlap region, wherein an aperture is provided in the overlap region in an electrically conductive coating on the top side of the carrier substrate for the waveguide structure integrated into the second portion of the carrier substrate, and wherein an electrically conductive connection element is provided on an edge of the aperture and is configured to electrically contact the electrically conductive coating on the top side and an electrically conductive coating on the bottom side of the carrier substrate with one another; and a monolithic microwave integrated circuit arranged in the first portion on the top side of the carrier substrate.

* * * * *